United States Patent [19]

Davis

[11] 4,308,921
[45] Jan. 5, 1982

[54] GROUND TRACK OBLITERATING DEVICE

[76] Inventor: Donald A. Davis, Rte. No. 2, Box 328, Covington, Ind. 47932

[21] Appl. No.: 79,374

[22] Filed: Sep. 27, 1979

[51] Int. Cl.³ .................... A01B 37/00; A01B 63/102
[52] U.S. Cl. .................................... 172/488; 172/676
[58] Field of Search ............... 172/134, 311, 488, 676, 172/198, 240, 310, 326, 327, 328, 396, 643, 694, 696

[56] References Cited

U.S. PATENT DOCUMENTS

| | | | |
|---|---|---|---|
| 2,970,656 | 2/1961 | Kampe | 172/328 X |
| 3,954,144 | 5/1976 | Blair | 172/311 |
| 4,120,365 | 10/1978 | Kuhn | 172/488 |
| 4,195,696 | 4/1980 | Lundin | 172/676 X |
| 4,210,210 | 7/1980 | Ankenman | 172/676 X |

Primary Examiner—Richard T. Stouffer
Attorney, Agent, or Firm—John R. Nesbitt; Robert E. Harris

[57] ABSTRACT

A track obliterating device is disclosed that is particularly useful for obliterating the tracks on the ground made by a chemical applicator wagon. The device includes a mounting frame upon which a plurality of ground engageable track obliterating elements are mounted. The track obliterating elements are preferably coil spring teeth that are mounted on the mounting frame so as to be substantially aligned with the wheels of an applicator wagon so that the tracks made by such wheels are obliterated as the device is pulled in a forwardly direction behind the applicator wagon. The mounting frame is adapted to be attached to an applicator wagon or the like by a hitch that is pivotally mounted to the mounting frame so that the mounting frame can pivot about a vertical axis. The hitch can be a bifurcated arm pivotably mounted to the mounting frame at spaced points with a single tongue adapted to be connected to the applicator wagon or may include a pair of spaced rods each of which are pivotably mounted to the mounting frame. A pair of wheels is also mounted to the mounting frame forwardly of the obliterating elements, and a controller, such as a piston and cylinder, is connected between the hitch and the mounting frame to raise and lower the obliterating elements with respect to the ground.

7 Claims, 4 Drawing Figures

GROUND TRACK OBLITERATING DEVICE

FIELD OF THE INVENTION

This invention relates to a track obliterating device and, more particularly, relates to a track obliterating device for a chemical applicator wagon.

BACKGROUND OF THE INVENTION

It is oftentimes necessary and/or desirable that the tracks made by a wagon or the like be obliterated. Such is the case, for example, where the wagon is pulled through a field and it is desirable that no tracks remain since the resulting soil compaction can cause water, for example, to stand in the tracks after rains.

The use of a sand trap rake behind the wheels of a tractor to smooth sand traps and the like has previously been suggested (see, for example, U.S. Pat. No. 3,823,781). In addition, it has also been suggested that tractor track obliterators utilizing coil springs and a drag behind tractor wheels might be utilized (see, for example, U.S. Pat. Nos. 1,422,967 and 2,277,880).

There still has remained a need, however, to provide a simple yet efficient device for obliterating the tracks of an applicator wagon and/or providing a track obliterating device capable of being readily adjusted and/or placed into and out of operation.

SUMMARY OF THE INVENTION

This invention provides a simple yet dependable track obliterating device that is well suited for use in obliterating the ground tracks of an applicator wagon. The obliterating device of this invention is also capable of adjustment and/or operational positioning.

It is therefore an object of this invention to provide an improved track obliterating device.

It is another object of this invention to provide an improved track obliterating device that is well suited for obliterating the ground tracks of an applicator wagon.

It is still another object of this invention to provide an improved track obliterating device that is dependable yet simple.

It is still another object of this invention to provide an improved track obliterating device that is readily adjustable and is operationally positionable.

It is still another object of this invention to provide an improved track obliterating device that includes a plurality of obliterating elements each of which has associated therewith a wheel.

With these and other objects in view, which will become apparent to one skilled in the art as the description proceeds, this invention resides in the novel construction, combination, and arrangement of parts substantially as hereinafter described, and more particularly defined by the appended claims, it being understood that such changes in the precise embodiments of the herein disclosed invention are meant to be included as come within the scope of the claims.

BRIEF DESCRIPTION OF THE DRAWINGS

The accompanying drawings illustrate complete embodiments of the invention according to the best mode so far devised for the practical application of the principles thereof, and in which.

DESCRIPTION OF THE INVENTION

Figure 1:
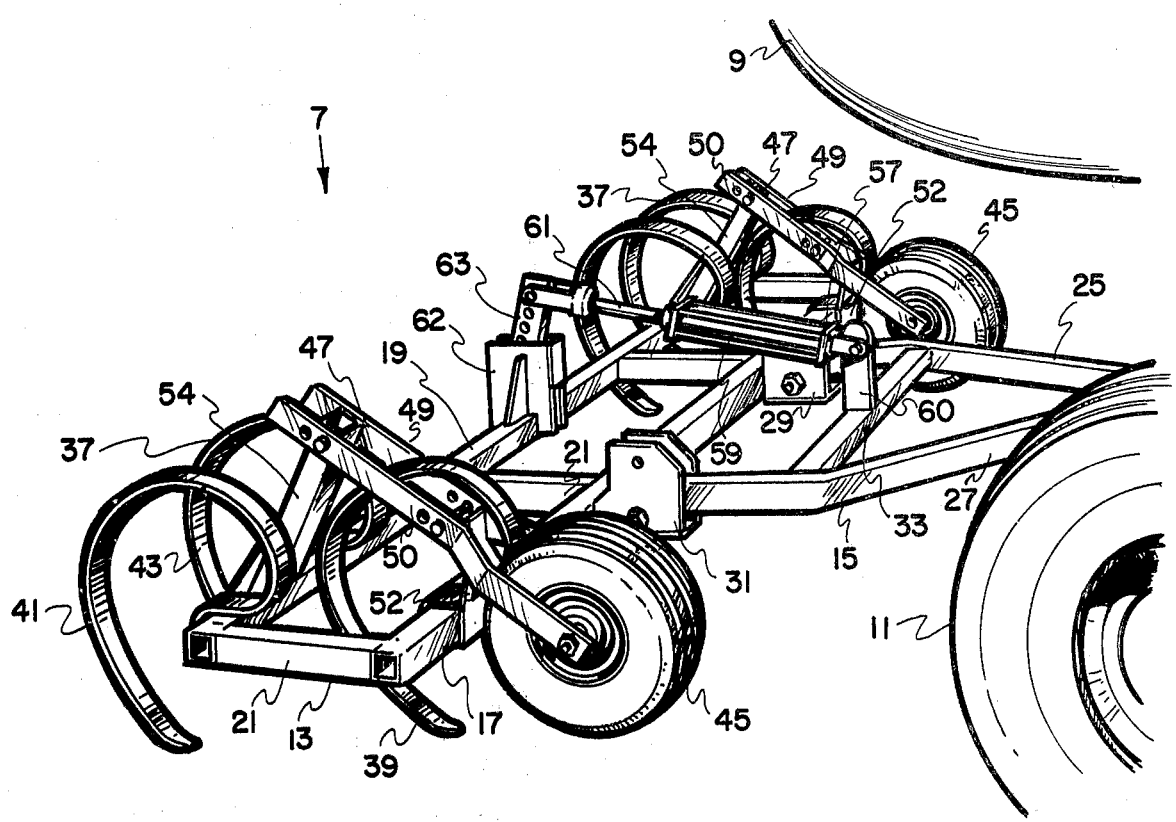
FIG. 1 is a perspective view of the track obliterating device of this invention shown in the operating position.
Figure 2:
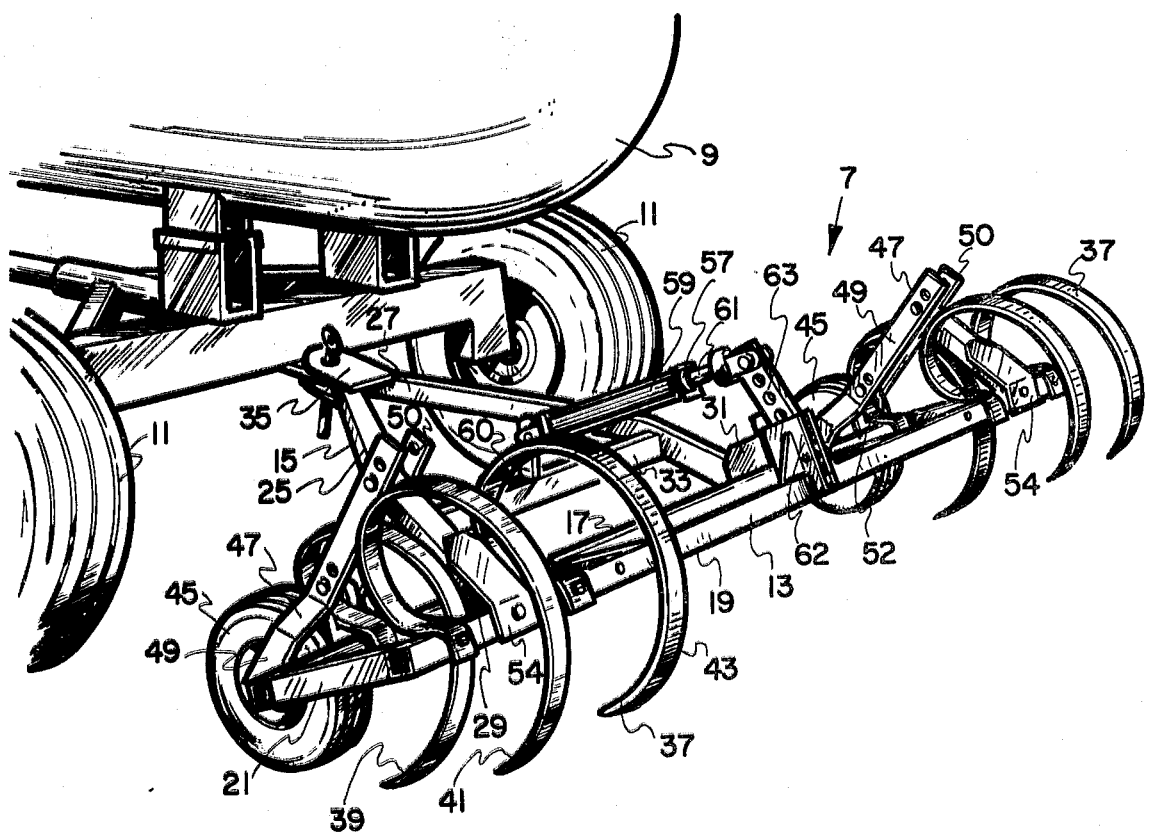
FIG. 2 is a perspective view of the device shown in FIG. 1 but with the device shown in a raised position.

Referring now to FIGS. 1 and 2, the track obliterating device 7 of this invention is shown mounted to a chemical applicator wagon 9. As shown, wagon 9 includes spaced wheels 11 as is conventional for chemical and fertilizer applicator wagons.

Obliterating device 7 includes a mounting frame 13 having a hitch 15 extending forwardly therefrom. As shown, mounting frame 13 includes a forward bar 17 and a rearward bar 19, which bars are spaced horizontal bars that extend normal to the intended direction of forward travel of the obliterating device. Bars 17 and 19 are connected by a plurality of spacer bars 21 extending therebetween. These bars may be, for example, 2"×2" steel bars with the bars 17 and 19 being of a length of about eight feet and bars 21 being of a length of about 1 foot. It is to be appreciated, however, that the material and/or sizes of the bars may be varied as needed or desired for a particular application.

As shown in FIGS. 1 and 2, hitch 15 may include a pair of bars 25 and 27 which are adjacent at one end and diverge from one another thereafter with the bars terminating at spaced pivot connections 29 and 31, respectively, for connection of the hitch to the mounting frame. As shown, the pivots 29 and 31 extend forwardly from forward bar 17 of mounting frame 13 and may include a pair of spaced plates with the pivot connections 29 and 31 of bars 25 and 27, respectively, received therebetween and the entire assembly connected with a nut and bolt in conventional fashion. In addition, as shown in FIGS. 1 and 2, a crossbar 33 extends between bars, or hitch legs 25 and 27. As also shown in FIG. 2, a single tongue 35 extends forwardly at the front of the hitch and is adapted for connection to the rear of applicator wagon 9 in conventional fashion.

A plurality of obliterating elements 37 are spaced along mounting frame 13. These obliterating elements are positioned on the frame so as to be substantially aligned with the wheels 11 of wagon 9 when the device is connected to the wagon by means of hitch 15. As shown, each obliterating element 37 includes three coil spring teeth 39, 41 and 43 and front tooth 39 extending from the forward bar 17 and rear teeth 41 and 43 extending from the rear bar with the rear teeth being spaced outwardly from one another at opposite sides of front tooth 39 (i.e., a line parallel to the normal direction of travel of the device and passing through the front tooth would pass between the teeth on the rear bar). While three coiled teeth are shown for each obliterating element 37 for purposes of illustration, it is to be realized that other configurations and/or teeth might be utilized as desired for any particular application.

As also shown in FIGS. 1 and 2, a wheel 45 is mounted on wheel mounting assembly 47 which assembly is mounted on bars 17 and 19 of mounting frame 13 so that the wheel is ground engageable forwardly of the obliterating element 37 and thus in line with the wheels of an applicator wagon when the device is attached thereto so that the obliterating elements will remove not only the tracks of the applicator wagon but also of wheel 45 as the device is pulled forward behind the applicator wagon. As shown, each mounting assembly 47 includes a pair of arms 49 and 50 the lower end of each of which diverge to receive wheel 45 therebetween, the middle portion of which is connected to one end of mounting bracket 52 (the other end of which mounting bracket is connected to front bar 17 of hitch 15), and the upper end of which is connected to one end of mounting bracket 54 (the other end of which bracket is connected to rear bar 19 of hitch 15). If desired, the mounting assembly can be adjustable so that the wheels can be adjusted with respect to the mounting frame to thus adjust the coil spring teeth with respect to the ground.

Control of pivoting of mounting frame 13 with respect to hitch 15 is effected by control assembly 57, which as shown in FIGS. 1 and 2, may include cylinder 59 connected to crossbar 33 of hitch 15 by means of bar 60 and piston 61 connected to rear bar 19 of mounting frame 13 by means of upstanding mounting bracket 62 having adjustable linkage 63 connected thereto. Hydraulic lines (not shown) may be provided for remote control of the cylinder in conventional fashion. Thus, by controlling operation of the piston and cylinder assembly (i.e., by controlling activation and retraction of the piston with respect to the cylinder), the amount of pivoting of mounting frame 13 with respect to hitch 15 is controlled so that the mounting frame pivots in a substantially vertical path and thus controls engagement of the coil spring teeth with the ground and/or the depth of penetration of the teeth into the ground, as desired in a particular situation. While a hydraulic piston and cylinder assembly is preferred, it is to be realized that other types of actuators could be utilized including a manual operated actuator.

Figure 3:
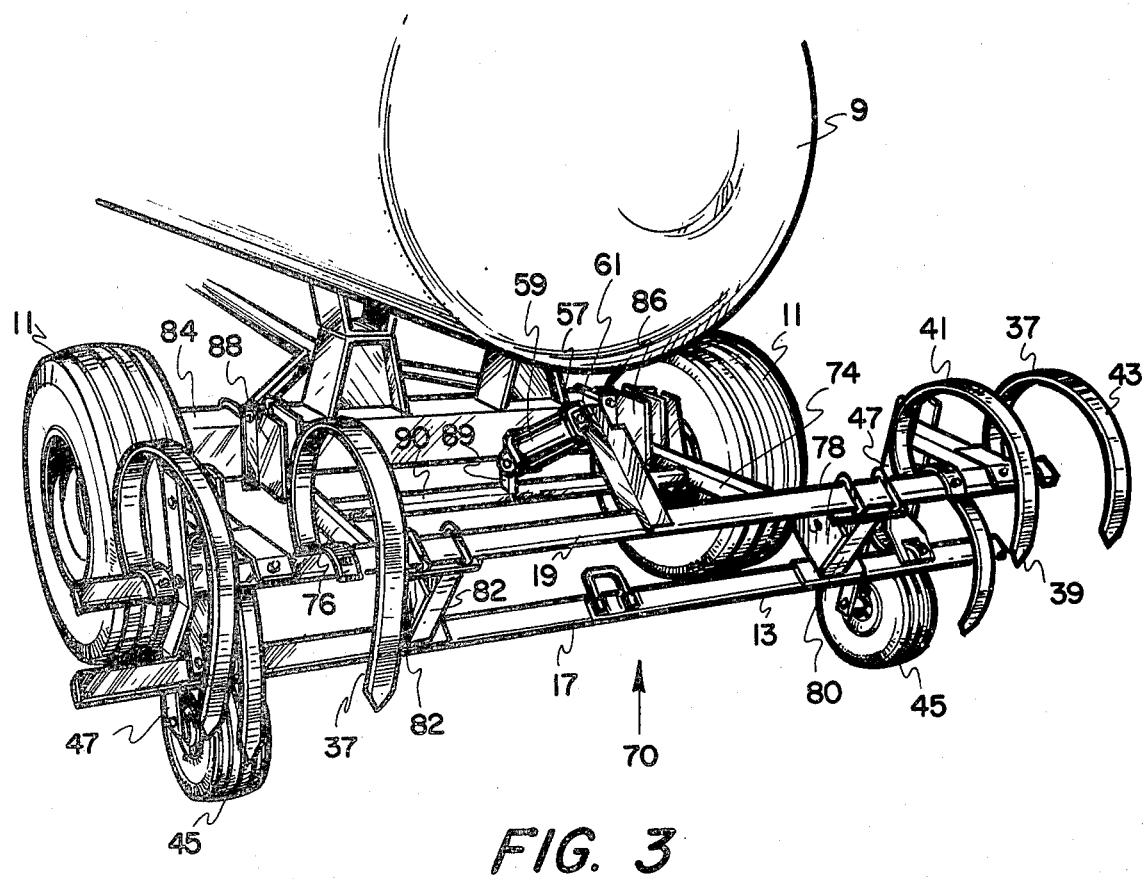
FIG. 3 is a perspective view of a second embodiment of the obliterating device of this invention with the device shown in the operating position.
Figure 4:
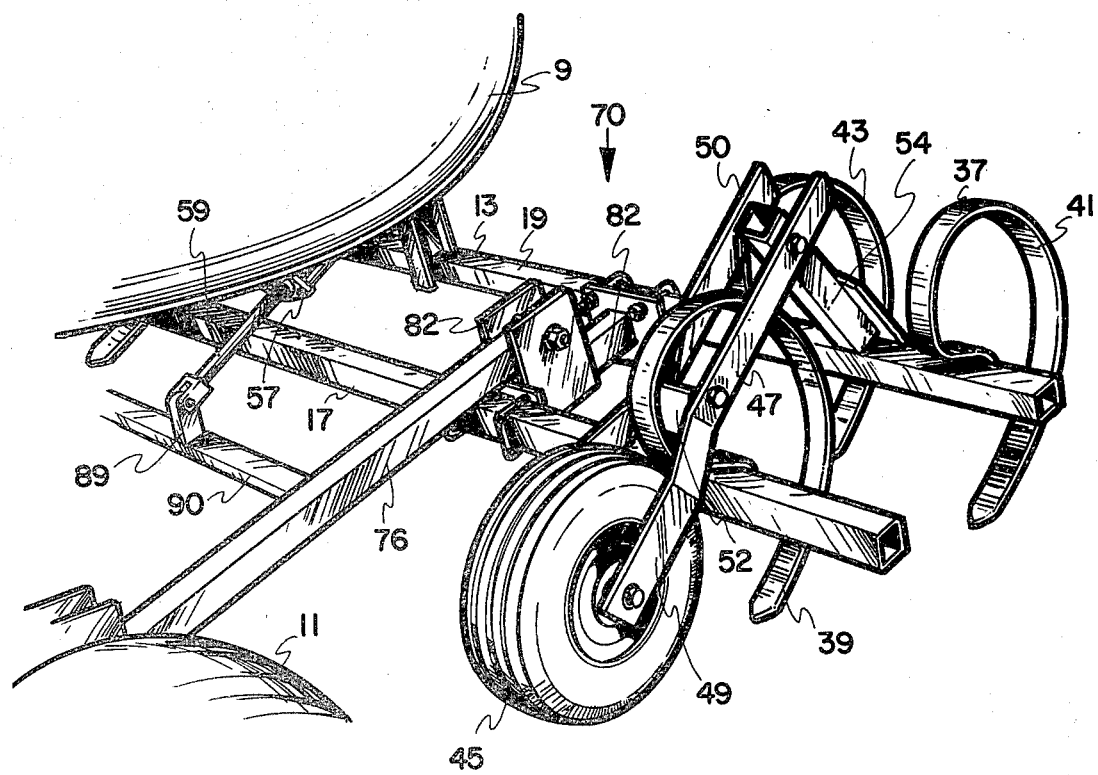
FIG. 4 is a perspective view of the device as shown in FIG. 3 but with the device shown in the raised position.

FIGS. 3 and 4 show a second embodiment 70 of the device of this invention. This embodiment is similar in structure to that of the embodiment shown in FIGS. 1 and 2, except that the hitch assembly 72 includes a pair of bars 74 and 76 which are pivotably connected to mounting frame 13 at the rear ends by means of spaced pivots 78 and 80, respectively, with pivots 78 and 80 being connected to spacer bars 82 extending between forward and rear bars 17 and 19. The front ends of bars 74 and 76 are connected to the applicator wagon at spaced points along the axle 84 by means of mounting brackets 86 and 88, respectively. In embodiment 70 shown in FIGS. 3 and 4, each wheel 45 is mounted substantially aligned with the coil spring teeth in the same manner described with respect to embodiment 7 of FIGS. 1 and 2, and the mounting frame 13 may be pivoted about a substantially horizontal axis in the same manner as described hereinabove with respect to FIGS. 1 and 2 utilizing a cylinder and piston arrangement with the cylinder being connected to tab 89 on crossbar 90 extending between bars 74 and 76 of the hitch assembly 72.

In operation, the device is pivoted to raise the teeth from ground engagement and thus out of the operating position to facilitate movement of the device. This positioning of the device is particularly shown in FIGS. 2 and 4 of the drawings. For the operating position, the mounting frame is lowered so that the coil spring teeth engage the ground to a depth as desired and as determined by the positioning of the wheels 45 in conjunction with the extent of withdrawal of piston 61 from cylinder 59. With the device attached to the rear of a chemical applicator wagon, the wagon is drawn forwardly, and as this occurs, wheels 45 follow in the tracks of the applicator wagon so that the following coil spring teeth 39, 41 and 43 engage the ground rearwardly of the tracks to obliterate the tracks made to thus leave the ground in non-compacted condition so that water and the like will be collected thereat.

As can be appreciated from the foregoing, this invention provides an improved obliterating device that is particularly useful for chemical applicator wagons.

What is claimed is:

1. A track obliterating device for a chemical applicator wagon, said device comprising:
   a chemical applicator wagon having a rear portion and spaced ground engaging wheels;
   a mounting frame;
   a hitch connected with said mounting frame and having a forwardly extending portion adapted for connection to said rear portion of said chemical applicator wagon;
   a plurality of groups of ground engageable elements mounted on said mounting frame with each group of said elements being positioned so that different ones of said groups of said elements are behind and substantially aligned with said wheels of said applicator wagon when said device is connected thereto in operating position whereby as said wagon is moved in a forwardly direction tracks created by said wheels of said applicator wagon are obliterated by said device; and
   a second set of wheels attached to said mounting frame with different ones of said second set of wheels being ground engageable forwardly of and substantially aligned with said ground engageable elements and said wheels of said applicator wagon so that tracks created by said second set of wheels are obliterated along with obliteration of tracks created by said wheels of said applicator wagon.

2. The device of claim 1 wherein each group of said plurality of ground engageable elements include coil spring teeth that depend from said mounting frame.

3. The device of claim 2 wherein said mounting frame includes a forward mounting bar and a rearward mounting bar, and wherein each group of said plurality of ground engageable elements include a plurality of coil spring teeth at least one of which is mounted on said forward mounting bar and the remainder of which are mounted on said rearward mounting bar.

4. The device of claim 4 wherein said wheels are adjustably mounted on said frame.

5. The device of claim 1 wherein said device includes frame control means connected between said mounting frame and said hitch for raising and lowering said ground engageable elements with respect to the ground.

6. The device of claim 5 wherein said hitch and said mounting frame are relatively pivotable and wherein said frame control means causes said mounting frame to be pivoted with respect to said hitch to thereby raise and lower said ground engageable elements.

7. The device of claim 6 wherein said frame control means includes a hydraulic piston and cylinder assembly.

* * * * *